July 26, 1927.
A. E. JOHNSON
ANIMAL TRAP
Filed March 22, 1926
1,636,745
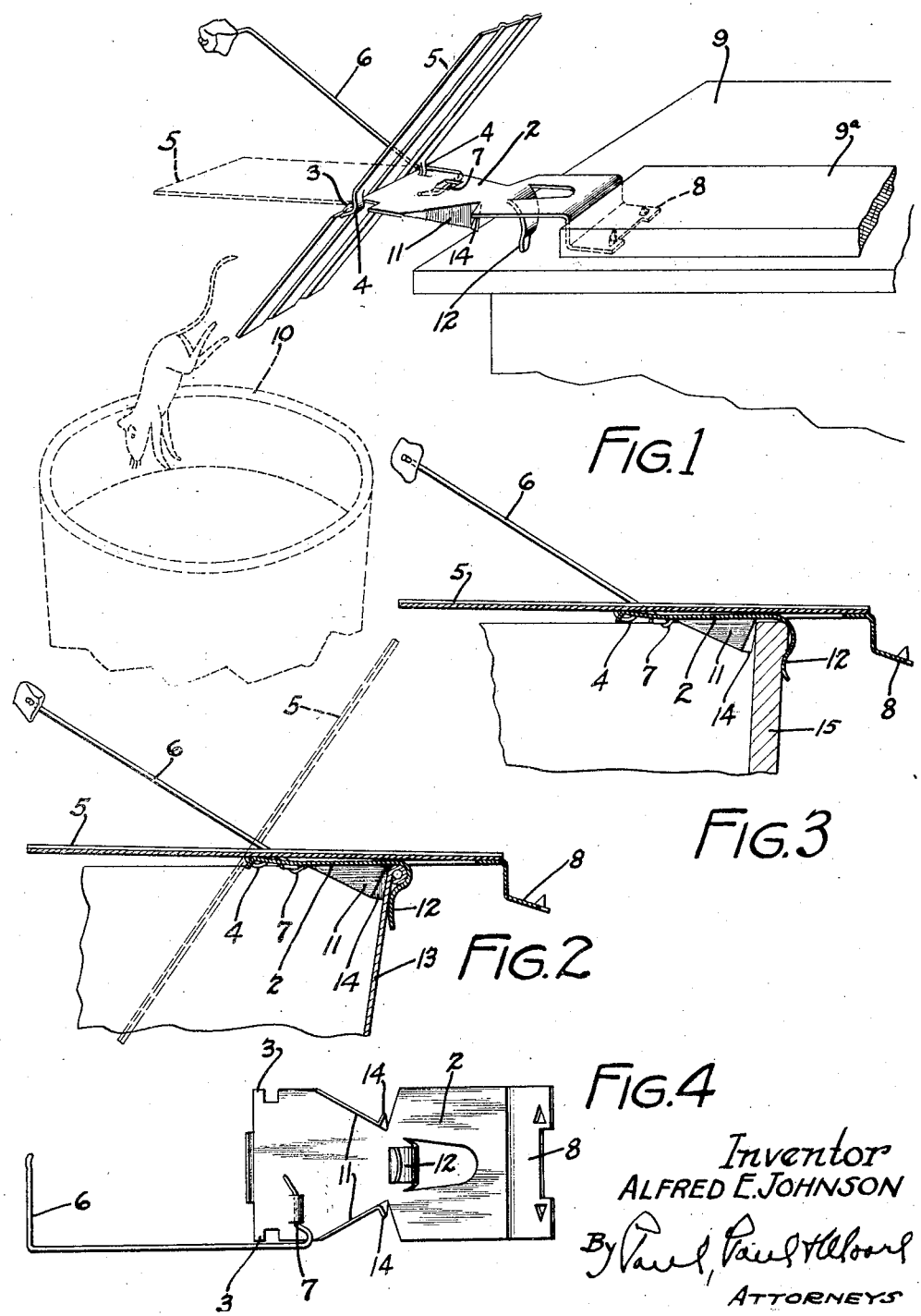
Inventor
ALFRED E. JOHNSON
By Paul, Paul & Moore
ATTORNEYS Patented July 26, 1927.

1,636,745

UNITED STATES PATENT OFFICE.

ALFRED ERICK JOHNSON, OF DULUTH, MINNESOTA, ASSIGNOR OF ONE-HALF TO M. M. BERG, OF DULUTH, MINNESOTA.

ANIMAL TRAP.

Application filed March 22, 1926. Serial No. 96,553.

My invention relates to a self-setting trap adapted particularly for catching rats and mice and is designed as an improvement over the trap shown and described in U. S. Patent #1,520,557, issued December 23, 1924, to Mons M. Berg.

The primary object of this invention is to provide a trap, stamped or formed from sheet metal adapted to be mounted on a flat surface or on the wall of a pail, jar or the like and composed of only two parts, thereby simplifying materially the construction and reducing the cost of manufacture.

A further object is to provide a trap that is adapted for convenient mounting on the flat surface of a table or shelf or on the vertical wall of a pail or jar or other receptacle Other objects of the invention will appear from the following detailed description.

The invention consists generally in various constructions and combinations all as hereinafter described and particularly pointed out in the claims.

In the accompanying drawing forming part of this specification.

Figure 1 is a perspective view illustrating the trap mounted on the flat surface of a table;

Figure 2 is a detail view showing the trap mounted on the wall of a pail;

Figure 3 illustrates how the trap may be conveniently mounted on the wall of a jar or crock;

Figure 4 is a view of the under side of the plate that forms a support for the tilting member of the trap.

In the drawing, 2 represents a plate of sheet metal having lugs 3 formed thereon at one end and adapted to enter loops 4 formed in the edges of a plate 5, preferably about midway between its ends. This plate is adapted to lie in a normally horizontal position on the plate 2, the weight of the end of the plate 5 overhanging the plate 2 being sufficient to retain the plate 5 in this position until overcome by the weight of the animal on the projecting end of the plate.

A wire 6 or other suitable means is mounted at 7 in a loop in the under side of the plate 2 and projects outwardly and upwardly therefrom to form a support for the bait which normally will be suspended above the outer end of the plate 5. This structure is substantially as shown and described in the Berg patent above referred to.

In Figure 1, I have shown the device mounted on the flat top 9 of a table, a flange 8 being provided at one end of the plate 2 to rest upon the table, and suitable means such as a piece of board $9^a$ may be placed on the flange to aid in holding the trap in its working position with the tilting plate supported at the end of the table above a suitable receptacle 10 which may be partially filled with water and into which the animal is discharged by the tilting of the plate. The plate 2 has lugs 11 pressed downwardly therefrom on each side and a tongue 12 is also formed to rest at its lower end upon the top of the table and cooperates with the flange 8 to hold the plate 2 at the desired level. This tongue is flexible and may be bent back and forth with the fingers until it assumes the desired form and provide a leg or rest for the plate on the top of the table or shelf or other horizontal support on which the trap may be mounted. The animal running along the top of the table will pass over the board $9^a$ and onto the end of the plate 5 which in its normal position conceals the opening in the plate 2 made by the formation of the tongue 12 and as the animal runs out on the end of the plate 5 to reach the bait, it will tilt under the weight and discharge the animal into the receptacle beneath.

In Figure 2, I have shown the device applied to a pail 13, the lugs 11 engaging the inner surface of the pail at the top while the tongue 12 is folded around the bead at the top of the pail, thereby holding the trap securely in place thereon. A suitable incline will be connected to the flange 8 so that the animal can mount to the top of the pail, and pass out on the tilting plate to reach the bait. I prefer, as shown in Figure 4, to form lips 14 on the edges of the lugs 11 to bear on the inner wall of the pail and hold the trap from tilting or swinging sidewise thereon, the lips having comparatively broad bearing surfaces and cooperating with the tongue on the other side of the pail wall to hold the plate 2 firmly while the trap is in use.

In Figure 3, the trap is shown mounted on a jar or crock 15 having thicker walls than the pail or receptacle shown in Figure 2, the tongue 12 being bent to provide a wider space between it and the lugs and accommodate the increased thickness in the wall of the jar. In other respects, the trap is mounted and used in substantially the same manner as described with reference to Figure 2.

It will be noted that this trap is made of two pieces only, the plate supporting the tilting member being utilized as a means for mounting the trap on the receptacle into which the animal is discharged. The lugs and tongue are pressed from the plate material and the tongue can be easily bent or folded to conform to the wall of the receptacle on which the trap is mounted. I am able, therefore, to eliminate the third piece or member of the trap entirely and effect a considerable saving in the cost of manufacture.

I claim as my invention:

1. A base member for the purpose described comprising a bendable metal sheet stamped and bent to provide transversely opposed depending stiffening and abutment elements, and a central transversely arranged depending tongue opposingly related to the ends of said abutment elements, said elements extending in a direction generally lengthwise of the member.

2. A base member for the purpose described, a bendable metal sheet stamped and bent to provide transversely opposed depending stiffening and abutment elements and a central depending flange opposingly related to said elements, the element extending in a direction generally lengthwise of the base, and having those ends adjacent the depending tongue laterally bent and substantially transversely alined to form perpendicular abutment surfaces.

3. A base member for the purpose described, comprising a metal sheet having a pair of marginal transversely opposed stiffening and abutment elements extending in a direction generally longitudinally, said elements bent perpendicularly to the face of the member, a central transversely disposed tongue opposingly related to the terminal edges of said abutment elements and said element being convergent toward said tongue.

4. An animal trap comprising a plate member having stiffening lugs pressed downwardly from the edges thereof and an intermediate tongue also pressed downwardly, said tongue being adapted to be bent or folded to engage the wall of a receptacle inserted between it and said stiffening lugs, a tilting plate mounted on said plate member and a bait-supporting means overhanging the outer portion of said tilting plate.

In witness whereof, I have hereunto set my hand this 19th day of March, 1926.

ALFRED ERICK JOHNSON.